US008694999B2

(12) United States Patent
Sundaram (10) Patent No.: US 8,694,999 B2
(45) Date of Patent: Apr. 8, 2014

(54) COOPERATIVE SCHEDULING OF MULTIPLE PARTITIONS IN A SINGLE TIME WINDOW

(75) Inventor: Anand N. Sundaram, Fremont, CA (US)

(73) Assignee: Wind River Systems, Inc., Alameda, CA (US)

( * ) Notice: Subject to any disclaimer, the term of this patent is extended or adjusted under 35 U.S.C. 154(b) by 1433 days.

(21) Appl. No.: 11/635,100

(22) Filed: Dec. 7, 2006

(65) Prior Publication Data

US 2008/0141267 A1 Jun. 12, 2008

(51) Int. Cl.
*G06F 9/46* (2006.01)

(52) U.S. Cl.
USPC .............................. 718/102; 718/100; 718/107

(58) Field of Classification Search
None
See application file for complete search history.

(56) References Cited

U.S. PATENT DOCUMENTS

| 4,584,644 | A | * | 4/1986 | Larner | 710/260 |
|---|---|---|---|---|---|
| 5,247,677 | A | * | 9/1993 | Welland et al. | 718/103 |
| 5,293,620 | A | * | 3/1994 | Barabash et al. | 718/102 |
| 6,052,707 | A | * | 4/2000 | D'Souza | 718/106 |
| 6,360,243 | B1 | * | 3/2002 | Lindsley et al. | 718/103 |
| 6,418,459 | B1 | * | 7/2002 | Gulick | 718/104 |
| 6,757,897 | B1 | * | 6/2004 | Shi et al. | 718/102 |
| 6,952,825 | B1 | * | 10/2005 | Cockx et al. | 718/102 |
| 7,103,745 | B2 | * | 9/2006 | Koning et al. | 711/173 |
| 7,334,142 | B2 | * | 2/2008 | Hack | 713/320 |
| 7,370,331 | B2 | * | 5/2008 | Brenner | 718/107 |
| 7,444,641 | B1 | * | 10/2008 | Diepstraten et al. | 718/107 |
| 7,451,447 | B1 | * | 11/2008 | Deshpande | 718/102 |
| 7,616,200 | B1 | * | 11/2009 | Heinrich et al. | 345/422 |
| 7,620,950 | B2 | * | 11/2009 | Mathias et al. | 718/100 |
| 7,735,087 | B2 | * | 6/2010 | Hayashi | 718/107 |
| 8,539,498 | B2 | * | 9/2013 | Bohra et al. | 718/104 |
| 2002/0040381 | A1 | * | 4/2002 | Steiger et al. | 709/102 |
| 2002/0103847 | A1 | * | 8/2002 | Potash | 709/107 |
| 2003/0018680 | A1 | * | 1/2003 | Iglesias et al. | 709/100 |
| 2003/0018689 | A1 | * | 1/2003 | Ramakrishnan | 709/104 |
| 2003/0037091 | A1 | * | 2/2003 | Nishimura et al. | 709/103 |
| 2003/0046324 | A1 | * | 3/2003 | Suzuki et al. | 709/100 |
| 2003/0115239 | A1 | * | 6/2003 | Togawa | 709/102 |
| 2003/0158884 | A1 | * | 8/2003 | Alford, Jr. | 709/104 |
| 2004/0049650 | A1 | * | 3/2004 | Ling et al. | 711/173 |
| 2004/0055003 | A1 | * | 3/2004 | Sundaram et al. | 718/108 |
| 2004/0078543 | A1 | * | 4/2004 | Koning et al. | 711/173 |
| 2004/0078799 | A1 | * | 4/2004 | Koning et al. | 719/313 |
| 2004/0131069 | A1 | * | 7/2004 | Ling et al. | 370/417 |
| 2004/0168170 | A1 | * | 8/2004 | Miller | 718/104 |
| 2004/0199632 | A1 | * | 10/2004 | Romero et al. | 709/226 |
| 2005/0015767 | A1 | * | 1/2005 | Nash et al. | 718/102 |
| 2005/0278719 | A1 | * | 12/2005 | Togawa | 718/100 |

(Continued)

*Primary Examiner* — Emerson Puente
*Assistant Examiner* — Hiren Patel
(74) *Attorney, Agent, or Firm* — Fay Kaplun & Marcin, LLP (57) ABSTRACT

Described is a method for determining whether a first partition selected to run in a time window is a member of a transaction, the transaction including at least one further partition, determining a tail partition from among the at least one further partition and scheduling the tail partition to run in the time window. A transaction scheduler having a transaction determination module determining whether a first partition selected to run in a time window is a member of a transaction, the transaction including at least one further partition, a tail determination module determining a tail partition from among the at least one further partition and a scheduling module scheduling the tail partition to run in the time window.

8 Claims, 5 Drawing Sheets

(56) References Cited

U.S. PATENT DOCUMENTS

| | | | |
|---|---|---|---|
| 2005/0283785 A1* | 12/2005 | D'Souza | 718/100 |
| 2006/0130062 A1* | 6/2006 | Burdick et al. | 718/100 |
| 2006/0190943 A1* | 8/2006 | Haeri | 718/103 |
| 2006/0206891 A1* | 9/2006 | Armstrong et al. | 718/1 |
| 2007/0136721 A1* | 6/2007 | Dunshea et al. | 717/174 |
| 2008/0052713 A1* | 2/2008 | Flemming et al. | 718/102 |
| 2008/0256542 A1* | 10/2008 | Kurata | 718/102 |

\* cited by examiner

COOPERATIVE SCHEDULING OF MULTIPLE PARTITIONS IN A SINGLE TIME WINDOW

BACKGROUND

Data processing systems utilize partitions to allocate resources. A partition is a subset of data processing system hardware resources allocated to an operating system wherein there is no overlap in resources allocated to two partitions. Two partitions may be allocated memory from a common memory chip such that the ranges of physical memory addresses directly accessible to each do not overlap. One partition may indirectly control memory of a second partition, but only by commanding a process of the second partition to directly operate on the memory. However, conventional technologies lack an ability to run programmatically multiple partitions in a single time window without breaking hard time/space partition scheduling.

SUMMARY OF THE INVENTION

A method for determining whether a first partition selected to run in a time window is a member of a transaction, the transaction including at least one further partition, determining a tail partition from among the at least one further partition and scheduling the tail partition to run in the time window.

A transaction scheduler having a transaction determination module determining whether a first partition selected to run in a time window is a member of a transaction, the transaction including at least one further partition, a tail determination module determining a tail partition from among the at least one further partition and a scheduling module scheduling the tail partition to run in the time window.

A system having a partition scheduler scheduling a first partition to run in a time window, a transaction scheduler scheduling a second partition to run in the time window when the transaction scheduler receives an indication that the first partition is ceding the time window and a computer running the second partition in the time window.

DETAILED DESCRIPTION

The present invention may be further understood with reference to the following description and the appended drawings, wherein like elements are referred to with the same reference numerals. The exemplary embodiments of the present invention describe a method of running a transaction where a transaction is a set of partitions that run cooperatively in a single time window. The transaction, partitions, and time window will be discussed in detail below. It should be noted that the term time window will be used interchangeably with the term time slice and time frame. However, those skilled in the art will understand in the context of processing, these terms are used to specify a space of time.

Figure 1:
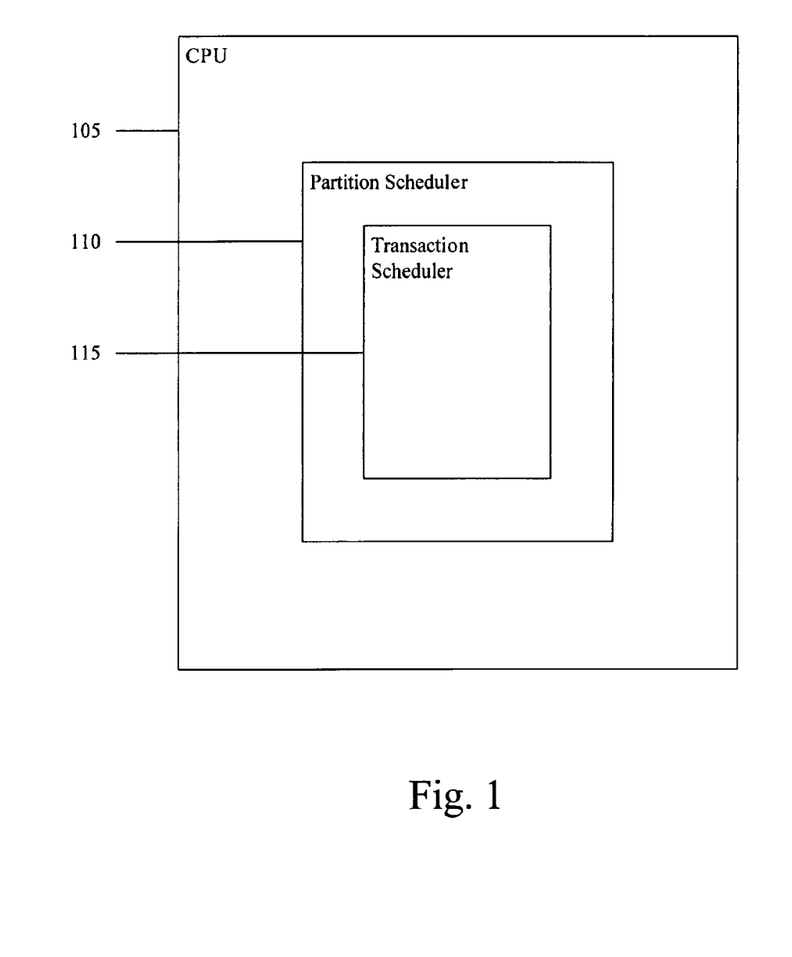
FIG. 1 shows an exemplary embodiment of a transaction scheduler layered on a partition scheduler according to the present invention.

FIG. 1 shows an exemplary embodiment of a transaction scheduler 115 layered on a partition scheduler 110 according to the present invention. A central processing unit (CPU) 105 is a component of a computing device that interprets instructions and processes data contained in programs. In interpreting instructions, the CPU 105 may control activities occurring within the computing device. The CPU 105 may also contain functionality to control the activities through, for example, different types of schedulers (e.g., priority-based preemptive scheduler, deadline scheduler, partition scheduler, etc.).

In the exemplary embodiment, one scheduler within the CPU 105 is the partition scheduler 110. The partitions scheduler 110 assigns partitions to the CPU 105. A partition is a block of code in a unique memory container and is scheduled by the partition scheduler 110 to run for a specified time window. Those skilled in the art will understand that the terms "blocks" and/or "processes" may also be used coextensively as the term "partitions" depending on the operating system. The partition scheduler 110 runs processes according to a sequence of time windows that are specified by the system designer. All other partitions are not allowed to run during the window of activity. Thus, in conventional technologies, when the time window of a partition is active, any tasks or functions of the partition that have a high priority will be certain to run since other partitions are allowed to run in that time window. According to the exemplary embodiment, the partition scheduler 110 chooses a partition to run in a single time window. The method by which the partition scheduler 110 chooses a partition may be accomplished using conventional methods. For example, in one exemplary embodiment, the scheduling method may be round-robin scheduling. However, the present invention may be implemented for a system that incorporates any type of scheduling mechanism.

In the exemplary embodiment, the partition scheduler 110 also includes a transaction scheduler 115. The transaction scheduler 115 is layered on top of the partition scheduler 110. The transaction scheduler 115 enables cooperative scheduling of multiple partitions (e.g., address spaces) in a single time window. A set of partitions that run cooperatively in a single time window will be referred to as a "transaction." The transaction scheduler 115 will be discussed in more detail below.

Figure 2:
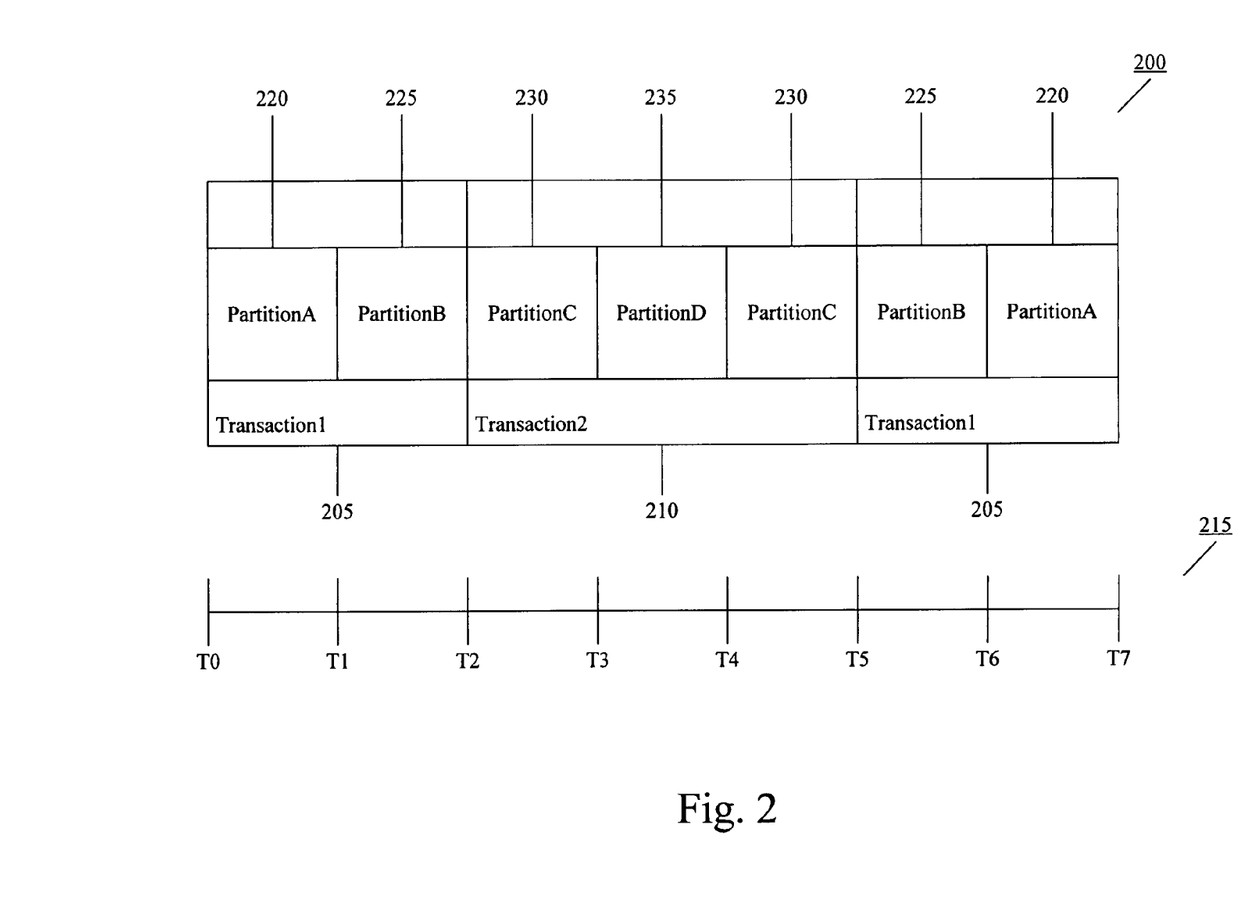
FIG. 2 shows an exemplary embodiment of a set of transactions according to the present invention.

FIG. 2 shows an exemplary embodiment of a set of transactions 200 according to the present invention. In the exemplary embodiment, the set of transactions 200 include two transactions (i.e., transaction nodes), transaction1 205 and transaction2 210. As discussed above, a transaction is a set of partitions. Thus, in the exemplary embodiment, the transaction1 205 contains two partitions, partitionA 220 and partitionB 225. The transaction2 210 also contains two partitions, partitionC 230 and partitionD 235. It should be noted that the use of two transactions and each transaction containing two partitions is only exemplary. Those skilled in the art will understand that according to the present invention, multiple transactions (e.g., greater than two) may exist and each transaction may contain multiple partitions (e.g., greater than two).

As discussed above, the partition scheduler 110 selects a partition to run in a single time window according to known methods, e.g., in a round-robin manner. Those skilled in the art will understand whether there are multiple partitions as in a transaction or a single partition, the selection process by the partition scheduler 110 remains the same. The chosen partition (e.g., partitionA 220) is referred to as running in periodic mode. The periodic mode partition (e.g., partitionA 220) may donate its time slice to another partition (e.g., partitionB 225) by calling the transaction scheduler 115 programmatically. The new partition that runs is referred to as running in transaction mode. By donating its time slice, a transaction is initiated (e.g., transaction1 205).

According to the exemplary embodiment, the partition selected by the partition scheduler 110 (e.g., partitionA 220) initiates a transaction by making a transaction start system call into the kernel operating on the CPU 105. This involves a cooperative context switch from the caller partition (e.g., partitionA 220) to the callee partition (e.g., partitionB 225). A chain effect may ensue where the new partition may in turn extend the transaction by making another partition run in transaction mode. For example, partitionB 225 may also make a transaction start system call, thereby relinquishing the CPU 105 to a further partition (not shown). This further partition would also run in transaction mode and would be considered to be part of transaction1 205. The transactions may extend dynamically within a time window with the head partition (e.g., partitionA 220) in periodic mode and a runable tail partition (e.g., partitionB 225) in transaction mode.

A partition running in transaction mode (e.g., partitionB 225) may relinquish the CPU 105 back to the caller partition (e.g., partitionA 220) by calling the transaction scheduler 115 programmatically. According to the exemplary embodiment, the callee partition (e.g., partitionB 225) makes a transaction terminate system call into the kernel of the CPU 105, thereby relinquishing the CPU 105 back to the caller partition (e.g., partitionA 220). According to the exemplary embodiments, multiple transactions may run concurrently whenever a transaction's periodic mode partition is chosen to run by the partition scheduler. Later, when a preempted transaction is rescheduled, only the tail partition of the transaction is made to run.

The exemplary embodiment of FIG. 2 will be used to describe two exemplary concurrently running transactions. At time T0 of time line 215, the partition scheduler 110 schedules partitionA 220 for a time slice of T0 to T2. Thus, as described above, the partitionA 220 is running in periodic mode. At time T1, the partitionA 220 makes a transaction start system call and schedules partitionB 225 in a cooperative manner. As discussed above, partitionA 220 and partitionB 225 create the transaction1 205. PartitionB 225 runs until the end of the current time slice (i.e., time T2). However, it is noted that, in this example, partitionB 225 does not relinquish the CPU 105 back to partitionA 220. The consequences of the partitionB 225 not relinquishing the CPU 105 will be discussed in greater detail below.

At time T2, the partition scheduler 110 schedules partitionC 230 for a time slice of T2 to T5. As discussed above, when the partition scheduler 110 selects a transaction's periodic mode partition to run, multiple transactions may run concurrently (e.g., transaction1 205 and transaction2 210 are running concurrently). At time T3, partitionC 230 donates a time slice to partitionD 235, thereby creating transaction2 210 from partitionC 230 and partitionD 235. However, unlike transaction1 205, partitionD 235 makes a transaction terminate system call, thereby relinquishing the CPU 105 back to partitionC 230 at time T4. Once the CPU 105 is relinquished, partitionC 230 runs until the end of its scheduled time slice, time T5.

At time T5, the partition scheduler 110 schedules partitionA 220 for a time slice of T5 to T7. However, since partitionB 225 never relinquished the CPU 105 back to partitionA 220 at time T2 prior to transaction2 210 running in time slice T2 to T5, partitionA 220 is blocked in a transaction start system call. Thus, as discussed above, the tail node of transaction1 205 (i.e., partitionB 225) is made to run on the CPU 105. Then at time T6, partitionB 225 makes a transaction terminate system call and relinquishes the CPU 105 back to partitionA 220. Then, partitionA 220 runs until the end of its current time slice, time T7.

As discussed above, it should be noted that the use of two partitions in a transaction is only exemplary and a transaction may contain more than two partitions. For example, a partition running in transaction mode could extend the transaction to another partition by making the transaction start system call. Therefore, the partition running in transaction mode was originally the callee partition but is now the caller partition. It should be noted that the mode of the partition does not change. In the remainder of this description, a partition that makes a transaction start system call is hereby referred to as a "client" and the partition that runs because of a client and eventually makes a transaction terminate system call is hereby referred to as a "server." Those skilled in the art will understand that within a time window, a particular partition may perform the functions of both a client and a server.

It should also be noted that a partition that was scheduled by the partition scheduler (i.e., partition running in periodic mode) may also run in transaction mode, and vice versa. For example, in FIG. 2, the partitionD 235 may have been scheduled by the partition scheduler 110 from time T2 to T5 and would thus run in periodic mode. The partitionD 235 would then make a transaction start system call and donate a time slice to the partitionC 230 at time T3 and the partitionC 230 would thus run in transaction mode. Thereafter, partitionC 230 would make a terminate system call at time T4 and relinquish the CPU 105 back to the partitionD 235. This example illustrates that a partition may perform as both a partition running in periodic mode and a partition running in transaction mode whether in a current time slice or a different time slice.

As discussed above, a transaction node (e.g., transactions 205, 210) abstracts a partition participating in a transaction. A transaction is abstracted as a list of transaction nodes. The list order represents the first node that indicates the partition that runs in periodic mode and initiates the transaction (e.g., partitionA 220 of transaction1 205) and any following nodes represent partitions that run in transaction mode (e.g., partitionB 225 of transaction1 205). It should be noted again, as discussed above, the tail node partition is the only partition that is made to run whenever the transaction is scheduled. For example, the partitionB 225 is the tail node of transaction1 205. Thus, when the transaction1 205 was reinitiated at time T5, the partitionB 225 was made to run.

Those skilled in the art will understand that according to the present invention, a partition that runs in transaction mode (e.g., partitionB 225) has one or more list of transaction nodes, each one representing a transaction in which it could participate. A partition that runs only in periodic mode has only one transaction node (i.e., the first node in the transaction initiated by the partition). Those skilled in the art will also understand that a transaction schedule implies donating time slices from one partition to another partition. Therefore, concurrent transactions cannot occur from a single client.

A transaction node comprises two parts, a client and a server. The client captures the state of a partition when acting as a client while the server captures the state of a partition when acting as a server. Each part runs through a set of states.

Figure 3A:
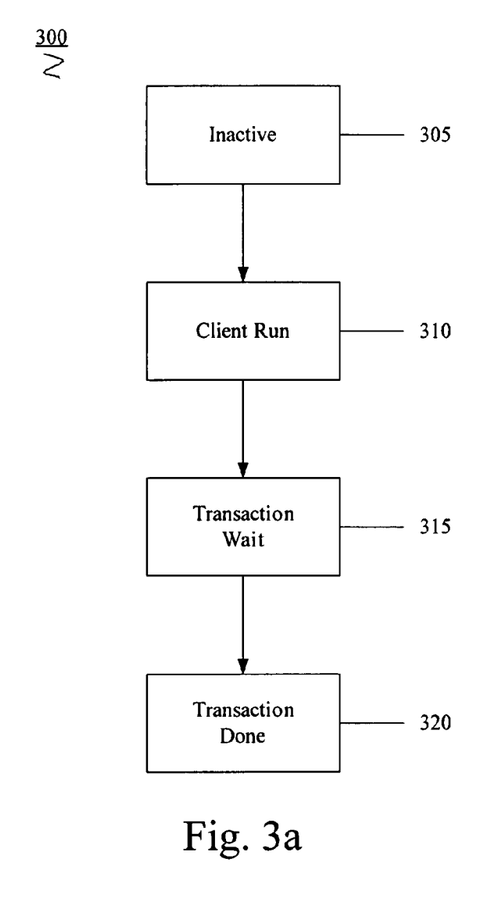
FIG. 3a shows an exemplary set of states for a client partition according to the present invention.

FIG. 3a shows an exemplary set of states 300 for a client partition according to the present invention. A first state 305 of the set of states 300 for a client partition is an inactive state. In the inactive state, the partition is not participating in any transaction. A second state 310 is a client run state. In this state, the partition (i.e., caller partition) issues a transaction start system call (i.e., partition becomes client) by making the server (i.e., callee partition) run through the start system call. A third state 315 is a transaction wait state. In this state, a transaction may be preempted by another transaction or partition through a pseudo-interrupt (hereinafter "interrupt"). The interrupt is a signal generated to indicate that another transaction or partition has a higher priority to run at a given time slice. For example, at time T2, the transaction2 210 interrupts transaction1 205. The partitionB 225 receives the interrupt and the transaction1 205 is preempted by the transaction2 210 by calling the partitionC 230. Then, once the preempting partition or transaction completes, the interrupted partition continues (i.e., the tail-end partition). The interrupts will be discussed in more detail below. A fourth state 320 is a transaction done state. In this state, the server relinquishes the CPU 105 back to the client by the server making a transaction terminate system call that completes the transaction mode partition (i.e., server).

Figure 3B:
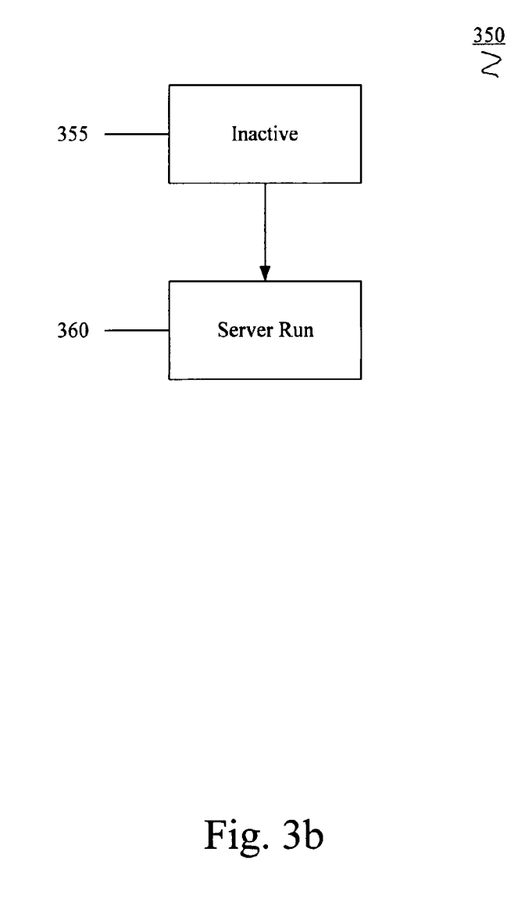
FIG. 3b shows an exemplary set of states for a server partition according to the present invention.

FIG. 3b shows an exemplary set of states 350 for a server partition according to the present invention. A first state 355 of the set of states 350 for a server partition is an inactive state. In the inactive state, the partition is not participating in any transaction. A second state 360 is a server run state. This state corresponds to the client run state where a transaction start system call was issued by the client to be run by the server. Once the transaction mode partition (i.e., server) completes, the server makes the transaction terminate system call, as discussed above in the fourth state 320. Therefore, the server only requires these two states to complete. However, it should be noted that the set of states 350 is only exemplary and further states may exist.

The interrupts are signals received by a partition from the kernel operating on the CPU (e.g., CPU 105). The interrupts may be asynchronous notifications related to a system resource state change (e.g., a transaction preempting another transaction, a partition preempting another partition, a transaction preempting a partition, a device interrupting a partition). A partition blocking in a transaction may be interrupted for interrupt processing (e.g., the third state 315). The partition would process interrupts, if any, and when the interrupt goes idle, the interrupted transaction would continue (e.g., transaction1 205 continues at time T5 once the transaction2 210 completes (e.g., goes idle)). Those skilled in the art will understand that in the exemplary embodiments, interrupt processing is given a higher priority than transaction processing. However, it should be noted that this priority is only exemplary and the present invention may utilize a different prioritization scheme where transaction processing has a higher priority than interrupt processing, priorities may be dependent on the types of transactions, times, specific applications, etc.

In order to track the interrupts that may occur within a transaction, the transaction nodes in a transaction may be connected to a partition context structure. The partition context structure may track the number of interrupts pending to be serviced by each partition. A periodic mode partition transaction node may track the total number of interrupts pending by all partitions participating in its transaction.

Figure 4:
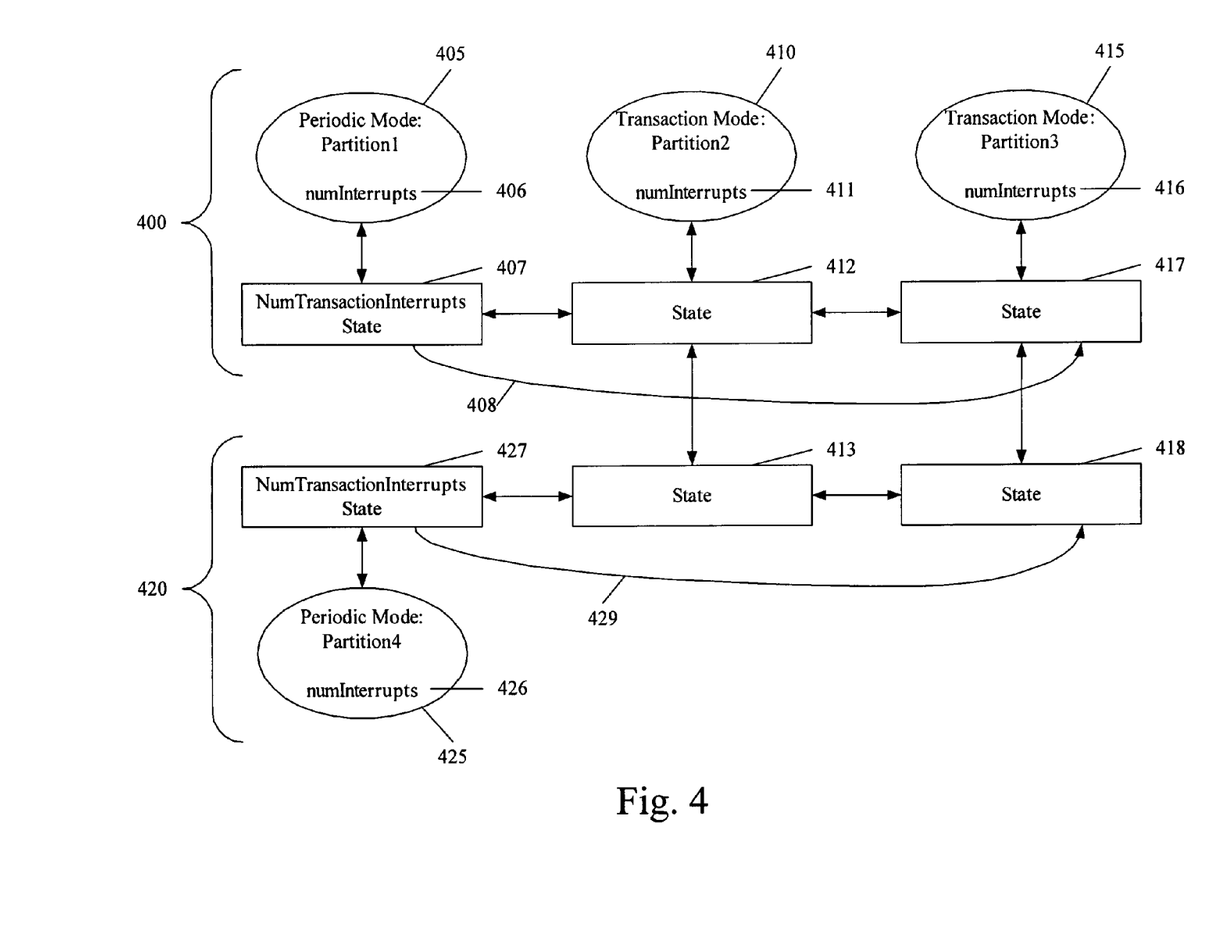
FIG. 4 shows an exemplary illustration of two transactions having the same set of partitions running in transaction mode according to FIG. 1.

FIG. 4 shows an exemplary illustration of two transactions 400 and 420 having the same set of partitions that run in transaction mode 410 and 415. This example will be used to describe the partition context structure and transaction nodes in more detail. Initially, a transactionX 400 includes parition1 405 operating in periodic mode and partition2 410 and partition3 415 in transaction mode. A transactionY 420 includes partition4 425 operating in periodic mode and partition2 410 and partition3 415 in transaction mode. Thus, FIG. 4 illustrates an exemplary embodiment where partition2 410 and partition3 415 in transaction mode are members of both transactionX 400 and transactionY 420.

Each partition includes a partition context structure that tracks the number of interrupts pending to be serviced by each partition. For example, the partition1 405 includes partition context structure 406 that tracks the number of interrupts ("numInterrupts") pending to be serviced by the partition1 405. Similarly, each of partition2 410 (partition context structure 411), partition3 415 (partition context structure 416), and partition4 425 (partition context structure 426) have corresponding partition context structures tracking the number of interrupts pending.

Each partition also includes a transaction node that indicates the state of each partition. For example, the partition1 405 includes a transaction node 407 indicating the state ("state") of the partition1 405. Similarly the partition4 425 includes a transaction node 427. Since partition2 410 is a member of both the transactionX 400 and the transactionY 420, the partition2 410 includes two transaction nodes 412 and 413 to indicate the state of the partition2 410 in each of the transactionX 400 and the transactionY 420, respectively. Similarly, partition3 415 has transaction nodes 417 and 418 to indicate the state of partition3 415 in each of the transactionX 400 and the transactionY 420, respectively.

In addition, the transaction node 407 of the partition1 405 (i.e., the head partition in periodic mode of transactionX 400), also tracks the total number of interrupts ("NumTransactionInterrupts") pending by all partitions participating in the transactionX 400 (e.g., partition1 405 numInterrupts+partition2 410 numInterrupts+partition3 415 numInterrupts). The transaction node 427 for partition4 425 includes similar information for the transactionY 420. The transaction node 407 of the partition1 405 also includes a pointer (illustrated as line 408) to the tail partition (i.e., partition3 415) of transactionX 400. As described above, when a transaction is scheduled, the tail node partition will run first. Thus, by including the pointer 408 in the transaction node 407 of the partition1 405, the transaction scheduler 115 will be able to discern the tail node of the transactionX 400. Similarly, by including the pointer 429 in the transaction node 427 of the partition1 425, the transaction scheduler 115 will be able to discern the tail node of the transactionY 420.

Figure 5:
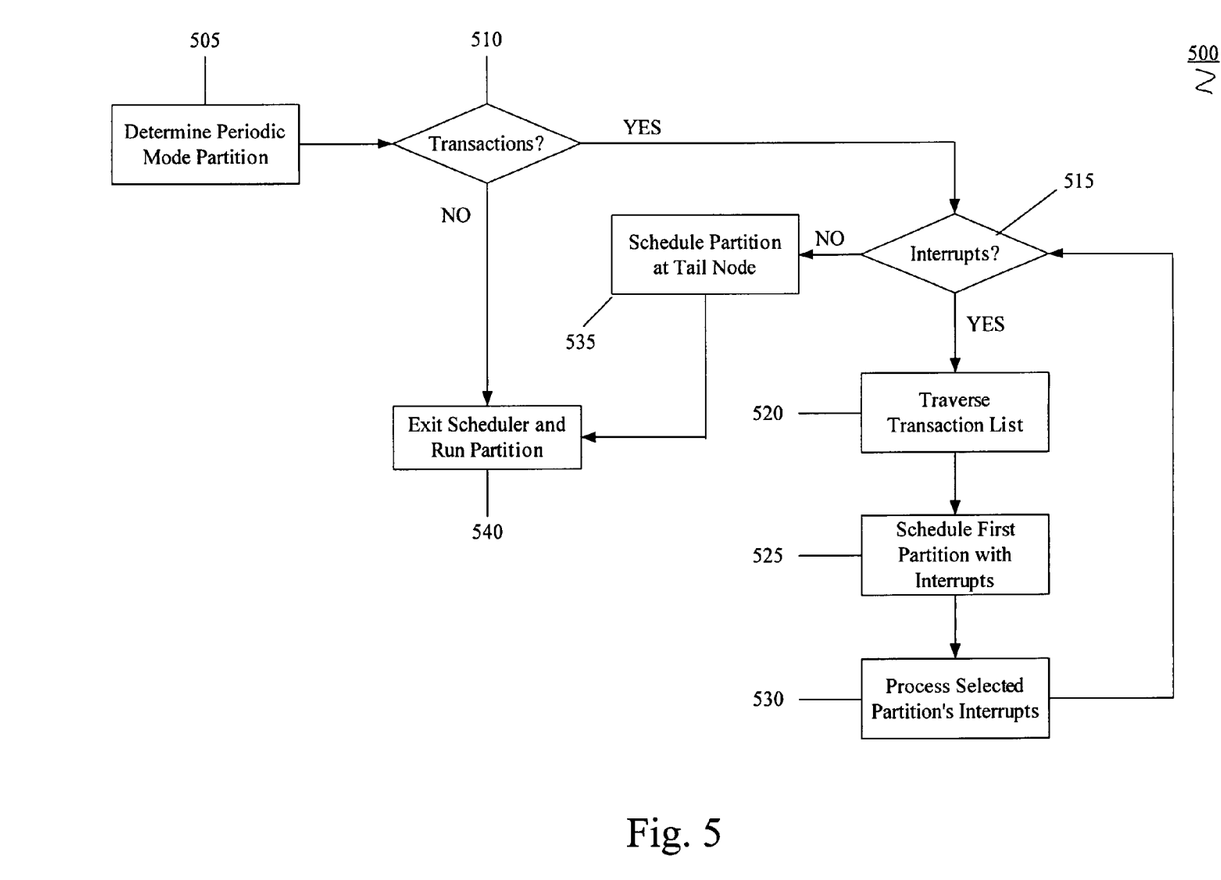
FIG. 5 shows an exemplary method of operation for a transaction scheduler according to the present invention.

FIG. 5 shows an exemplary method 500 of operation of a transaction scheduler 115. This exemplary operation will be described with reference to the beginning of a time slice window. The method will also be described with reference to the illustration of FIG. 4. Those skilled in the art will understand that the exemplary embodiment of the transaction scheduler 115 may be implemented as a software module located in the kernel operating on the CPU 105. However, the transaction scheduler 115 may be implemented in any number of manners, including, as a separate software module, as a combination of hardware and software, etc.

The method 500 starts at the beginning of a time slice window with step 505 where the partition to run in periodic mode is determined. For example, partition1 405 of transactionX 400 is running in periodic mode. If the periodic mode partition is the only partition in the transaction (i.e., in step 510, it is determined that the partition in periodic mode is not a member of a transaction), then the method 500 ends at step 540 where the transaction scheduler 115 is exited and the periodic mode partition is run. However, if the method 500 determines at step 510 that the periodic mode partition is a member of a transaction, then the method 500 continues to step 515. Referring to FIG. 4, if the transaction scheduler 115 looked at periodic mode partition1 405, it would determine that partition1 405 is a member of a transaction and the method 500 would continue to step 515. This determination may be made, for example, by determining the existence of transaction node 407 of partition1 405 (e.g., if partition1 405 were not a member of a transaction, the transaction node would not exist). However, there may be other methods of determining if a partition is a member of a transaction such as the existence of a partition context structure or a separately saved list of transactions and partitions.

As discussed above, the interrupt processing is given a higher priority than transaction processing and the periodic mode partition may track the total number of interrupts that are pending by all the partitions participating in its transaction. Thus, in step 515, the method 500 determines (via the period mode partition) if there are any interrupts pending. As described above, the transaction node 407 of the periodic mode partition1 405 keeps track of the number of interrupts for the entire transaction. Thus, the transaction scheduler 115 can determine whether there are any interrupts pending for the entire transaction by simply referring to the transaction node of the periodic mode partition (e.g., transaction node 407 of partition1 405). It should be noted, as discussed above, that the priority of the exemplary embodiment is only exemplary. If the transaction processing is given a higher priority, then the method would adjust to compensate for this priority change.

If no interrupts are present in step 515, the process continues to step 535 where the transaction scheduler 115 schedules the partition in the tail node of the transaction. In the example of transactionX 400 of FIG. 4, the tail node is partition3 415. The transaction scheduler 115 determines the tail node based on the pointer 408 in the transaction node 407 of the periodic mode partition1 405. the method then continues to step 540 where the transaction scheduler 115 is exited and the partition3 415 is run.

If the step 515 determines that there are interrupts, then the method 500 continues to step 520, where the transaction scheduler 115 traverses the transaction list to scan for any pending interrupts (e.g., numInterrupts of partition context structure is not equal to zero). At step 525, the transaction scheduler 115 schedules the first partition with interrupts. The selected partition is allowed to process its interrupts at step 530. The process then returns to step 515 where it is again determined if there are any remaining interrupts. If there are any remaining interrupts, the process continues to steps 520-530. It should be noted that the previously selected partition will no longer have any pending interrupts as they have been processed at step 530 (on the first pass of the method 500).

Once the interrupts have been settled by going through steps 520-530 as many times as needed, the method 500 determines that there are no more interrupts present, as was the case when there were no interrupts to start, as discussed above. The method continues to step 535 where the tail node of the transaction is scheduled by the transaction scheduler 115.

In addition to the functionality described above, the transaction scheduler according to the exemplary embodiments may also include additional functionalities. For example, if any partition in the transaction shutdowns abruptly, the transaction scheduler may be used to gracefully tear down the transaction. This functionality may be accomplished by giving the time slice in which the faulty partition is operating back to the periodic mode partition of the transaction and notifying server partitions in the transaction about the client partition shutdown.

Another exemplary functionality of the transaction scheduler is the prevention of fault propagation from a server partition to a client partition when the server partition fails to terminate the transaction in a deterministic timely fashion. This may be accomplished by tearing down the transaction forcibly and shutdown of the server partition. This is based on an assumption that the server partition is operating faulty.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   executing a transaction that includes a first partition and a second partition;
   requesting, by the first partition, access to a processing device for a first time window;
   granting, to the first partition, transferable access to run in a periodic mode on the processing device for the first time window, wherein the periodic mode indicates that the transferable access granted to the first partition is transferable by the first partition at an arbitrary time during the first time window;
   during the first time window, receiving, from the first partition, a relinquishment of control of the processing device to the second partition, the relinquishment comprising a first transaction start system call issued by the first partition;
   granting, to the second partition, transferable access to run in a transaction mode on the processing device during the first time window, wherein the transaction mode indicates that the transferable access granted to the second partition has been transferred to the second partition from the first partition running in periodic mode; and
   during the first time window and after the first transaction start system call, receiving, from the second partition, a further relinquishment of control of the processing device, wherein the further relinquishment of control of the processing device is to one of the first partition and a third partition,
   wherein, when the further relinquishment of control is back to the first partition, the further relinquishment comprising a first transaction terminate call issued by the second partition, and
   wherein, when the further relinquishment of control is to the third partition, the further relinquishment comprising a second transaction start system call issued by the second partition, wherein each of the first and second transaction start system calls is made into a kernel operating on the processing device.

2. The method of claim 1, wherein the first partition is a head partition.

3. The method of claim 1, wherein the second partition is a tail partition.

4. The method of claim 3, wherein the tail partition is made to run upon being allocated to the first time window.

5. A non-transitory computer-readable storage medium storing a set of instructions executable by a processing unit, the set of instructions, when executed by the processing unit, causing the processing unit to perform operations comprising:
- executing a transaction that includes a first partition and a second partition;
- requesting, by the first partition, access to a processing device for a first time window;
- granting, to the first partition, transferable access to run in a periodic mode on the processing device for the first time window, wherein the periodic mode indicates that the transferable access granted to the first partition is transferable by the first partition at an arbitrary time during the first time window;
- during the first time window, receiving, from the first partition, a relinquishment of control of the processing device to the second partition, the relinquishment comprising a first transaction start system call issued by the first partition;
- granting, to the second partition, transferable access to run in a transaction mode on the processing device during the first time window, wherein the transaction mode indicates that the transferable access granted to the second partition has been transferred to the second partition from the first partition running in periodic mode; and
- during the first time window and after the first transaction start system call, receiving, from the second partition, a further relinquishment of control of the processing device, wherein the further relinquishment of control of the processing device is to one of the first partition and a third partition,
- wherein, when the further relinquishment of control is back to the first partition, the further relinquishment comprising a first transaction terminate call issued by the second partition, and
- wherein, when the further relinquishment of control is to the third partition, the further relinquishment comprising a second transaction start system call issued by the second partition, wherein each of the first and second transaction start system calls is made into a kernel operating on the processing device.

6. The non-transitory computer-readable storage medium of claim 5, wherein the first partition is a head partition.

7. The non-transitory computer-readable storage medium of claim 5, wherein the second partition is a tail partition.

8. The non-transitory computer-readable storage medium of claim 7, wherein the tail partition is made to run upon being allocated to the first time window.

* * * * *